United States Patent [19]

Haarstad et al.

[11] Patent Number: 5,638,864

[45] Date of Patent: Jun. 17, 1997

[54] STEERING CONTROL UNIT WITH FLOW AMPLIFICATION FOR UNEQUAL AREA CYLINDER

[75] Inventors: Donald M. Haarstad, Chaska; Timothy A. Hjelsand, Waconia; Bernard J. Larson, New Hope, all of Minn.

[73] Assignee: Eaton Corporation, Cleveland, Ohio

[21] Appl. No.: 561,905

[22] Filed: Nov. 22, 1995

[51] Int. Cl.⁶ .................................................. F15B 13/04
[52] U.S. Cl. ...................... 137/625.24; 60/384; 91/467
[58] Field of Search ...................... 60/384; 91/467; 137/625.24

[56] References Cited

U.S. PATENT DOCUMENTS

4,558,720  12/1985  Larson et al. .................. 137/625.24
4,759,182   7/1988  Haarstad ............................. 60/384
4,958,493   9/1990  Schutten ............................. 60/384

*Primary Examiner*—Gerald A. Michalsky
*Attorney, Agent, or Firm*—L. J. Kasper

[57] ABSTRACT

A fluid controller (15) for use with an unequal area cylinder (25) having a rod end area A and a head end area B. The controller valving (27) includes, in one embodiment, a flow amplification path (101) for only one direction of steering. In another embodiment, the controller valving (27) includes flow amplification in both directions of steering, but with the ratios being different. In either case, the ratio of flow to the head end to flow to the rod end equals the ratio B/A, whereby the fluid controller requires the same number of turns, lock-to-lock, for either direction of steering.

5 Claims, 6 Drawing Sheets

STEERING CONTROL UNIT WITH FLOW AMPLIFICATION FOR UNEQUAL AREA CYLINDER

BACKGROUND OF THE DISCLOSURE

The present invention relates to fluid controllers for use in vehicle steering systems, and more particularly, to such controllers which are to be used with unequal area steering cylinders.

There are now a number of vehicles which utilize full fluid linked steering systems, including fluid controllers of the type to which the present invention relates, wherein it is considered desirable to utilize unequal area steering cylinders. An unequal area cylinder is one having only a single rod extending from the cylinder, such that the cylinder has a "rod end" having a particular cross-sectional area subject to fluid pressure ("flow area"), and a "head end" having a relatively larger cross-sectional area ("flow area"). In many vehicle applications, the use of unequal area of cylinders is desirable because the linkage arrangement and overall installation is simplified, and therefore, less expensive than is the case for a double rod end cylinder.

In a typical fluid controller of the type to which the present invention relates, the fluid flow output from the controller is the same in either direction, assuming equal steering wheel rotation, for reasons which are well understood by those skilled in the art. Unfortunately, this characteristic of fluid controllers has limited their usefulness with unequal area cylinders. When the prior art fluid controller is used with an unequal area cylinder, the result is that the operator experiences a different number of turns lock-to-lock in one direction than in the other. Such an arrangement is generally considered unacceptable to the vehicle manufacturers, because most operators prefer that the vehicle move in a straight line when the steering wheel is in its centered position, and having a different number of turns lock-to-lock will eliminate the desired registry between the steered wheels and the steering wheel.

SUMMARY OF THE INVENTION

Accordingly, it is an object of the present invention to provide an improved fluid controller for use with an unequal area cylinder which makes it possible to accomplish the same number of turns, lock-to-lock, of the steering wheel.

The above and other objects of the invention are accomplished by the provision of a controller operable to control the flow of fluid from a source of pressurized fluid to an unequal area piston-cylinder fluid pressure device having a rod end area and a head end area, in which the ratio of said head end area to said rod end area is X. The controller is of the type including housing means defining an inlet port for connection to the source of pressurized fluid, a return port for connection to a reservoir, and first and second control fluid ports for connection to the rod end area and head end area, respectively of the fluid pressure device. A valve means is disposed in the housing means and defines a neutral position and first and second operating positions, oppositely disposed about the neutral position. The housing means and the valve means cooperate to define a first main fluid path communicating between the inlet port and the first control fluid port when the valve means is in the first operating position, and to define a second main fluid path communicating between the inlet port and the second control fluid port, when the valve means is in the second operating position. A fluid actuated means for imparting follow-up movement to the valve means proportional to the volume of fluid flow through the fluid actuated means is included, the fluid actuated means being disposed in series flow relationship in the first main fluid path when the valve means is in the first operating position, and in series flow relationship in the second main fluid path when the valve means is in the second operating position. The first and second main fluid paths each include a variable flow control orifice having a minimum flow area when the valve means is in the neutral position, and an increasing flow area as the valve means is displaced toward, respectively, the first and second operating positions. The housing means and the valve means cooperate to define first and second amplification fluid paths, in parallel with, respectively, the first and second main fluid paths, the first and second amplification fluid paths bypassing the fluid actuated means and including, respectively, first and second variable amplification orifices. The variable flow control orifices of the first and second main fluid paths have equal flow areas when the valve means is in, respectively, the first and second operating positions.

The improved fluid controller is characterized by the first variable amplification orifice having a flow area D when the valve means is in said first operating position. The second variable amplification orifice has a flow area E when the valve means is in the second operating position; whereby:

the ratio of the flow areas (C+E) to said flow areas (C+D) is equal to X.

DESCRIPTION OF THE PREFERRED EMBODIMENT

Figure 1:
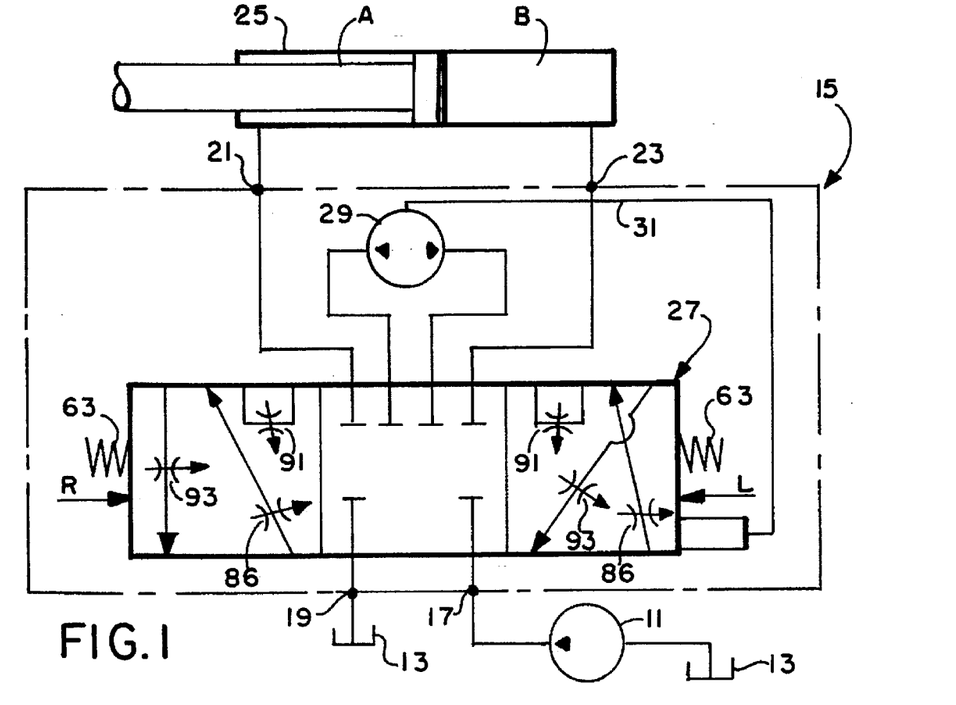
FIG. 1 is a hydraulic schematic of a hydrostatic power steering system including an unequal area steering cylinder.

Referring now to the drawings, which are not intended to limit the invention, FIG. 1 is a hydraulic schematic of a vehicle hydrostatic steering system including a fluid controller made in accordance with the teachings of the present invention. The system includes a fluid pump 11, shown herein as a fixed displacement pump for ease of illustration, having its inlet connected to a system reservoir 13. The output of the pump 11 is directed to the hydrostatic steering system, and more specifically, to a fluid controller 15.

Referring still to FIG. 1, the fluid controller 15 includes an inlet port 17, a return port 19, and a pair of control (cylinder)

fluid ports 21 and 23, which are connected to the opposite ends of a steering cylinder 25. In accordance with one aspect of the present invention, the steering cylinder 25 is an unequal area cylinder, i.e., a cylinder which has a "rod end" having a cross-sectional area (flow area) & and a "head end", having a cross-sectional area (flow area) B.

The fluid controller 15, which will be described in greater detail in conjunction with FIG. 2, may be of the general type illustrated and described in U.S. Pat. No. Re. 25,126, assigned to the assignee of the present invention and incorporated herein by reference. More specifically, the controller 15 includes a valving arrangement, generally designated 27, which is moveable from its neutral position shown schematically in FIG. 1 to either a right turn position R or a left turn position L. When the valving 27 is in either of the turn positions, the pressurized fluid flowing through the valving 27 also flows through a fluid meter 29, one function of which is to measure (meter) the proper amount of fluid to be communicated to the appropriate control port 21 or 23. As is well known to those skilled in the art, the other function of the fluid meter 29 is to provide follow-up movement to the valving 27, such that the valving 27 is returned to its neutral position after the desired amount of fluid has been communicated to the steering cylinder 25. In FIG. 1, this follow-up movement is achieved by means of a mechanical follow-up connection, indicated schematically at 31.

As is shown schematically in FIG. 1, the valving 27 defines a plurality of variable orifices whenever the valving is moved from its neutral position to one of its operating positions, either the right turn position R or the left turn position L. These variable orifices will be described in greater detail subsequently in conjunction with the detailed description of FIGS. 3 through 6.

FLUID CONTROLLER 15

Figure 2:
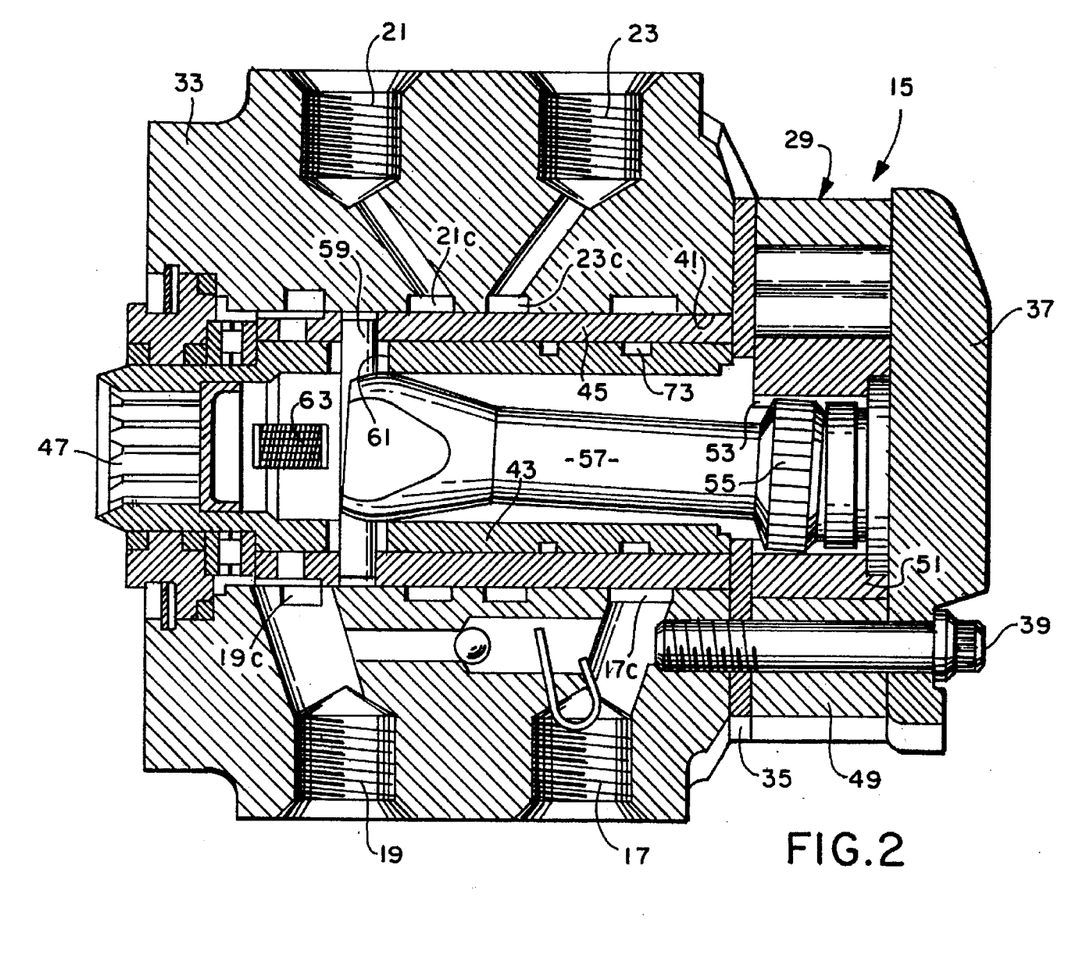
FIG. 2 is an axial cross-section of a fluid controller of the type to which the present invention relates.

Referring now to FIG. 2, the construction of the fluid controller will be described in some detail. The controller 15 comprises several sections, including a housing section 33, a port plate 35, a section comprising the fluid meter 29, and an end plate 37. These sections are held together in tight, sealing engagement by means of a plurality of bolts 39, which are in threaded engagement with the housing section 33. The housing section 33 defines the inlet port 17, the return port 19, and the control ports 21 and 23.

Rotatably disposed within a valve bore 41 defined by the housing section 33 is the valving arrangement 27. The valving 27 comprises a primary, rotatable valve member 43 (hereinafter also the "spool"), and a cooperating, relatively rotatable follow-up valve member 45 (hereinafter also the "sleeve"). At the forward end of the spool is a portion having a reduced diameter and defining a set of internal splines 47 which provide for a direct mechanical connection between the spool 43 and a steering wheel (not shown). The spool 43 and sleeve 45 will be described in greater detail subsequently.

The fluid meter 29 may be of a type well known in the art and includes an internally toothed ring 49, and an externally toothed star 51. The star 51 defines a set of internal splines 53, and in splined engagement therewith is a set of external splines 55, formed at the rearward end of a drive shaft 57. The shaft 57 has a bifurcated forward end permitting driving connection between the shaft 57 and the sleeve 45, by means of a pin 59 passing through a pair of pin openings 61 in the spool 43. Thus, pressurized fluid flowing through the valving 27, in response to rotation of the steering wheel and the spool 43 flows through the fluid meter 29, causing orbital and rotational movement of the star 51 within the ring 49. Such movement of the star 51 causes follow-up movement of the sleeve 45 by means of the drive shaft 57 and pin 59 (which comprise the follow-up connection 31 of FIG. 1). This movement maintains a particular relative displacement between the spool 43 and sleeve 45, for a given, constant rate of rotation of the steering wheel. A plurality of leaf springs 63 extend through an opening in the sleeve 45, biasing the sleeve 45 toward its neutral position, relative to the spool 43.

It may be seen in FIG. 2 that the housing section 33 defines four annular chambers surrounding the sleeve 45, to provide fluid communication between the outer surface of the sleeve 45 and the various ports 17, 19, 21 and 23. The various annular chambers are designated by the reference numeral of the respective port, accompanied by the letter "c".

The toothed interaction of the star 51, orbiting and rotating within the ring 49, defines a plurality of expanding and contracting fluid volume chambers, and adjacent each chamber, the port plate 35 defines a fluid port (not shown in FIG. 2) as is well known to those skilled in the art. The housing section 33 provides a plurality of axial bores (also not shown in FIG. 2), each of which is in open communication at one end with one of the fluid ports in the port plate 35, and at its other end, with the valve bore 41.

Valving Arrangement 27

Figure 4:
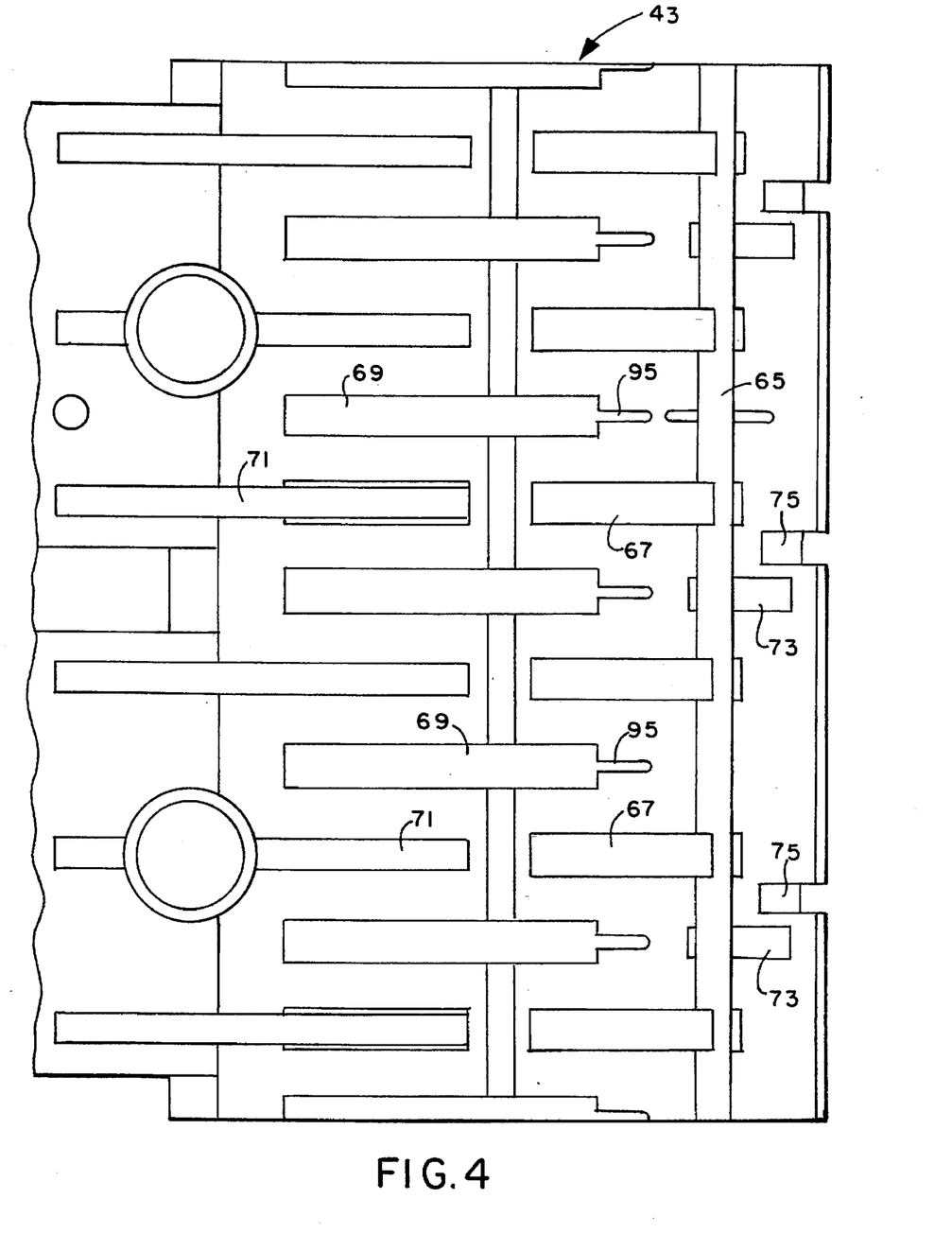
FIG. 4 is a flat view of the spool valve of the fluid controller shown in FIG. 2, but on a larger scale than in FIG. 2.
Figure 5:
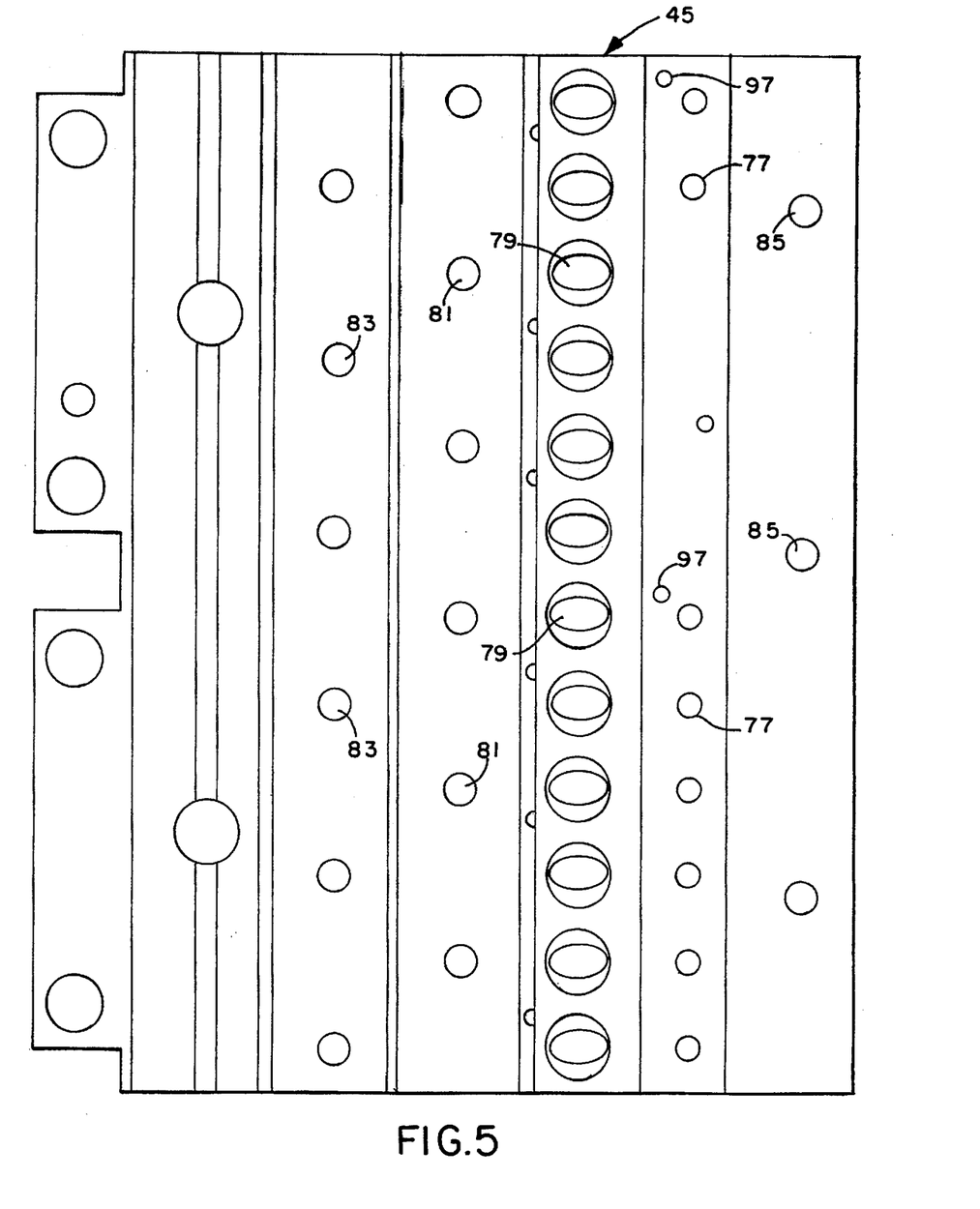
FIG. 5 is a flat view of the sleeve valve of the fluid controller shown in FIG. 2, and on the same scale as FIG. 4.

Referring now primarily to FIG. 4, the spool 43 and sleeve 45 will be described in greater detail. It should be noted that FIG. 4 illustrates the outer surface of the spool 43, while FIG. 5 illustrates the outer surface of the sleeve 45. The spool 43 defines an annular groove 65, and in communication therewith, a plurality of axial slots 67. Circumferentially displaced from each of the axial slots 67 is a longer axial slot 69, and circumferentially aligned with each of the axial slots 67 is an even longer axial slot 71, the function of which will be described subsequently. To the right of the annular groove 65, the spool 43 defines a plurality of axial, open-center slots 73, each of which has, adjacent thereto, a slot 75 which is in open communication, toward its right end, with the interior of the spool 43. Other structural details of the spool 43 which are well known but are not relevant to the present invention will not be described.

The sleeve 45 defines a plurality of pressure ports 77, in communication with the annular chamber 17c. To the leer of the ports 77 is a plurality of meter ports 79, which communicate between the valving arrangement 27 and the expanding and contracting volume chambers of the fluid meter 29. In the subject embodiment, and by way of example only, the star 51 has six (N) external teeth, and the ring 49 has seven (N+1) internal teeth, so there are twelve (2N) of the meter ports 79. Disposed to the left of the meter ports 79 is a plurality of cylinder ports 81, in communication with the annular chamber 23c, and further to the left, a plurality of cylinder ports 83, in communication with the annular chamber 21c.

Operation Of Valving 27

It is believed that the basic operation of the controller 15 and the valving 27 described thus far should be readily apparent in view of the teachings of the above incorporated patent. However, the operation of the controller and valving will be described briefly, partly to relate the structure illustrated in FIGS. 2, 4, and 5 to the schematics of FIGS. 1 and 3. The operation of the valving will be described in connection with FIGS. 6 through 8, which are enlarged (relative to FIGS. 4 and 5), fragmentary overlay views of the spool 43 (dashed lines), and the sleeve 45 (solid lines, but showing only those features on the inside surface of the sleeve).

Figure 6:
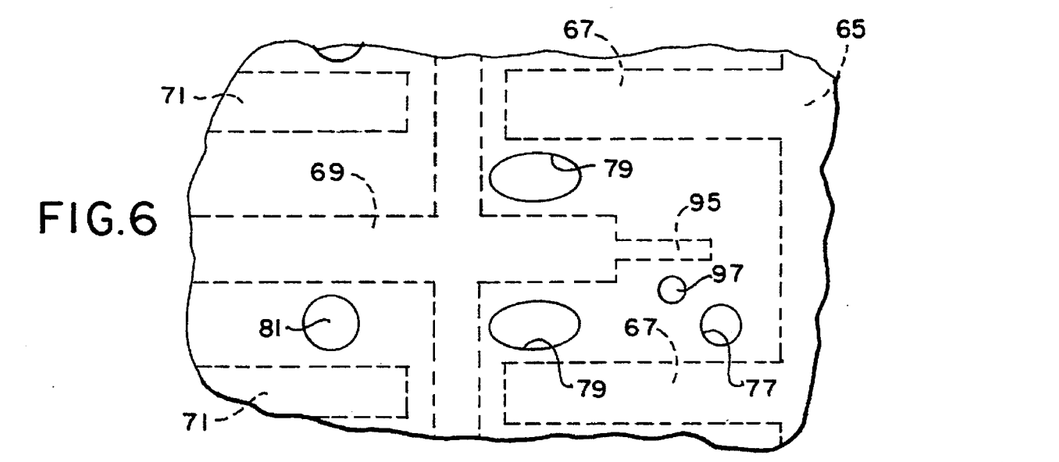
FIG. 6 is an enlarged, fragmentary overlay view of the valving shown in FIGS. 4 and 5, with the valving in its neutral position.

Referring now primarily to FIG. 6, when the valving 27 is in the neutral position (no rotation of the steering wheel), inlet fluid is communicated from the inlet port 17 into the annular chamber 17c. The pressure ports 77 are in open communication with the annular chamber 17c, but there is no flow through the pressure ports 77 because, in the neutral position of FIG. 6, the ports 77 are blocked from communication with any of the slots or grooves defined by the spool 43. Instead, inlet fluid flows from the annular chamber 17c through the open center slots 73, through open center holes 85, and through the slots 75, in a manner well known to those skilled in the art, eventually reaching the system reservoir 13.

Figure 3:
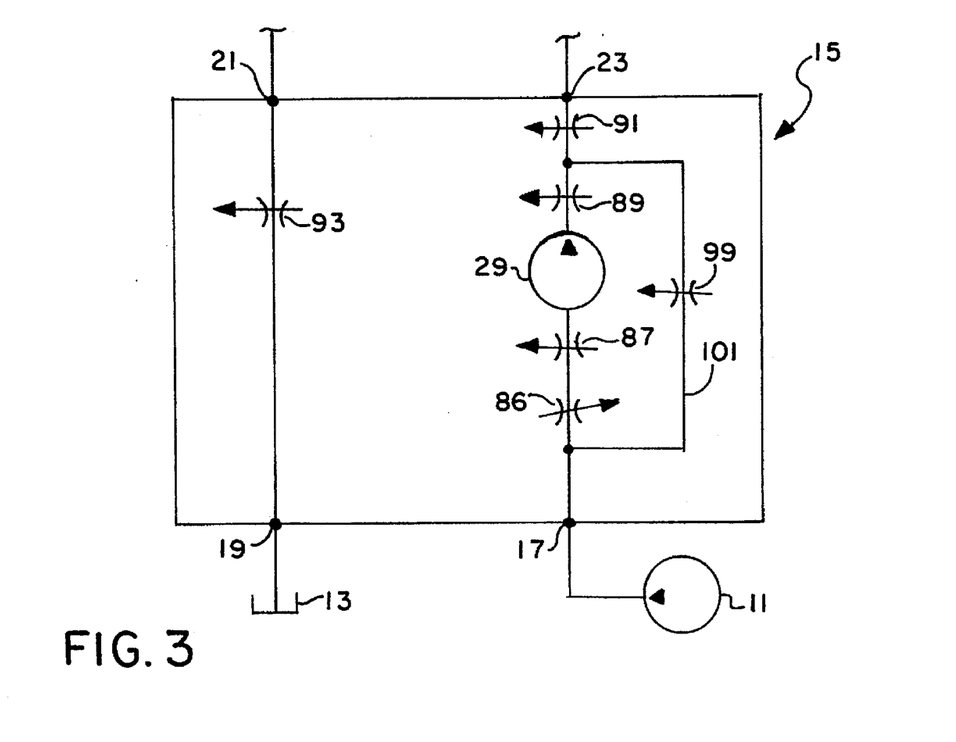
FIG. 3 is a unidirectional flow diagram illustrating the fluid controller shown schematically in FIG. 1, in a right turn condition.
Figure 7:
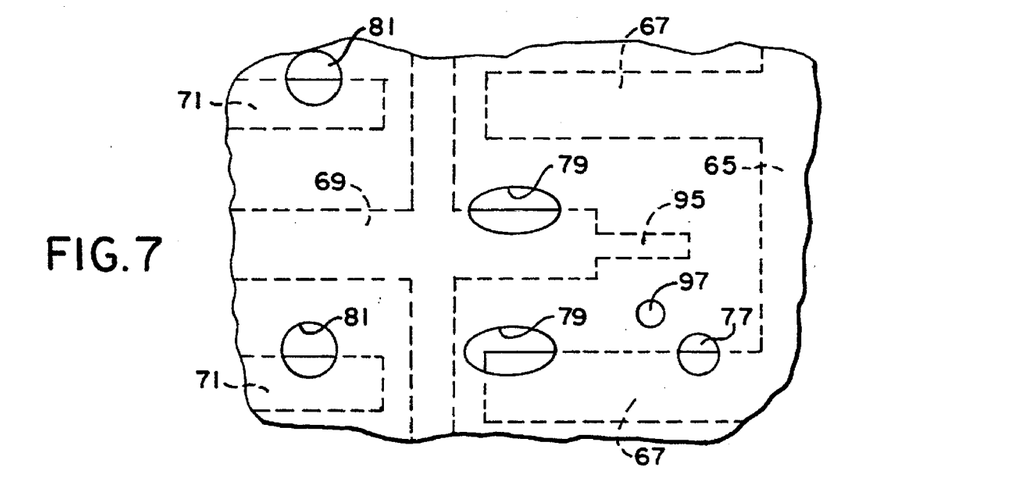
FIGS. 7 and 8 are enlarged, fragmentary overlay views, similar to FIG. 6, but with the valving in left turn and right turn conditions, respectively.

Referring now to FIG. 7, in conjunction with FIGS. 3, 4 and 5, when the steering wheel is rotated counterclockwise (a left turn condition), the spool 43 is displaced from its neutral position, relative to the sleeve 45, and each of the pressure ports 77 begins to communicate with one of the axial slots 67, and therefore, with every other one of the meter ports 79. The communication between each of the pressure ports 77 and its respective axial slot 67 defines a variable orifice, the composite of these individual variable orifices comprising a main variable flow control orifice 86 (also referred to as the A1 orifice). At the same time, each of the axial slots 67 begins to communicate with one of the meter ports 79, the area of overlap therebetween defining a variable orifice, and the composite of these comprising a variable flow control orifice 87 (the A2 orifice). Every other meter port 79 is in communication with an axial slot 67, and the alternate meter ports 79 are now in communication with the longer axial slots 69. The area of overlap between each of these meter ports 79 and the respective axial slots 69 defines a variable orifice, and the composite of these comprises a variable flow control orifice 89 (the A3 orifice).

Referring now also to FIGS. 4 and 5, with the spool 43 and the sleeve 45 in the position shown in FIG. 7, each of the slots 69 begins to communicate with an adjacent one of the cylinder ports 83, the overlap therebetween defining a variable orifice, and the composite of these individual orifices comprising a variable flow control orifice 91 (the A4 orifice). As is well known to those skilled in the art, the cylinder ports 83 are in communication, by means of the annular chamber 21c with the cylinder port 21, and then with the rod end A of the cylinder 25. Fluid returning from the head end B of the cylinder 25 enters the cylinder port 23, then flows through the annular chamber 23c, and then through the cylinder ports 81 which are now in fluid communication with the axial slots 71. The area of overlap of the ports 81 and the slots 71 defines a variable orifice, the composite of these individual variable orifices comprising a variable flow control orifice 93 (the A5 orifice). Therefore, the flow path through the variable flow control orifices 86, 87, 89, and 91, as just described, comprises the "main fluid path" in the left turn condition.

Figure 8:
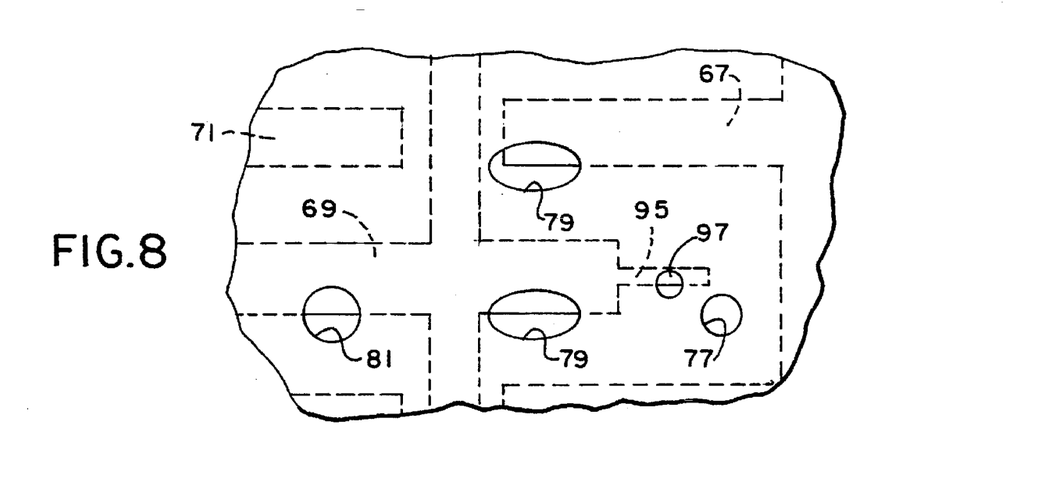

Referring now primarily to FIG. 8, when the steering wheel is rotated clockwise (a right turn condition), the spool 43 is displaced from the neutral position, relative to the sleeve 45 in a direction opposite that illustrated in FIG. 7. In view of the above, detailed explanation of a left turn, it is believed that one skilled in the art would readily understand the sequence of events (communication of ports and slots, etc.) involved in a right turn, and therefore, the right turn condition will be described only briefly. In FIG. 8, in a right turn condition, the spool 43 is now moving "down" relative to the sleeve 45 (rather than "up" as in FIG. 7). Thus, the pressure ports 77 communicate through the axial slots 67 with the "alternating" meter ports 79 which are now in fluid communication with the axial slots 69 and the cylinder ports 81. Metered fluid, in a right turn, flows through the cylinder ports 81 then through the annular chamber 23c to the cylinder port 23, and from there to the head end B of the cylinder 25. Fluid returning from the rod end A of the cylinder 25 flows to the control port 21 then to the annular chamber 21c, then through the cylinder ports 83 and into the axial slots 71. It should be noted that the right turn condition just described is the condition which is schematically illustrated in FIG. 3, i.e., the "main" fluid path, passing through the variable flow control orifices 86, 87, 89, and 91 communicates with the control port 23, whereas the control port 21 communicates through the variable flow control orifice 93 to the outlet port 19 and the system reservoir 13.

Flow Amplification

Up to this point in the description, it should be apparent to those skilled in the art that the flow through the main fluid path would be the same for the left turn condition of FIG. 7 as for the right turn condition of FIG. 8, for a given displacement of the steering wheel. However, in view of the difference between the rod end area A and the head end area B, it is clear that such equality is not desirable. As was mentioned in the BACKGROUND OF THE DISCLOSURE, when a conventional fluid controller is utilized with an unequal area cylinder, one result is, in response to seemingly equal steering inputs, there is a different number of turns lock-to-lock.

In accordance with the present invention, the above problem is addressed by the use of "flow amplification" technology of the type set forth in U.S. Pat. Nos. 4,759,182 and 4,958,493, assigned to the assignee of the present invention and incorporated herein by reference. Presently, the assignee of the invention is commercially marketing fluid controllers utilizing such flow amplification technology, under the trademark "Q-Amp" ®.

Referring now primarily to FIG. 4, adjacent the right end of each of the axial slots 69 is a small axial slot 95, which is in open fluid communication with the slot 69. Referring now to FIG. 5, adjacent certain of the pressure ports 77 is a flow amplification port 97, there being two of the amplification ports 97 in the subject embodiment, i.e., disposed 180 degrees apart, circumferentially.

Referring now to FIG. 7, it may be seen that in the neutral position of the spool 43 and sleeve 45, the flow amplification port 97 is blocked from communication with the axial slot port 95. As the spool 43 is rotated to the left turn condition of FIG. 7, the port 97 is displaced away from the slot 95, such that the only flow to the steering cylinder 25 is that which flows through the main fluid path, described previously, which therefore must correspond to the rod end area A.

When the spool is rotated toward the right turn condition shown in FIG. 8, the flow amplification port 97 begins to communicate with the axial slot 95, the overlap therebetween defining a variable orifice, and the composite of these two individual orifices comprises a variable amplification orifice 99 (see FIG. 3). Thus, as is now well known to those skilled in the art, a certain amount of the flow entering the inlet port 17 flows in a parallel, amplification fluid path 101, which "tees off" from the main fluid path, upstream of the A1 orifice (orifice 86), then recombines with the main flow path at a location disposed between the A3 and A4 orifices (orifices 89 and 91). Therefore, the A4 orifice must be sized for the total flow (i.e., main fluid path plus amplification fluid path), whereas the A1, A2, and A3 orifices are sized to handle only the main fluid path.

It is an important aspect of the present invention to utilize flow amplification technology, but to do so in a way which makes it possible to compensate for the difference between the rod end area A and the head end area B of an unequal area cylinder. In the subject embodiment, this is accomplished by having no flow amplification when communicating metered fluid to the rod end of the cylinder, while having flow amplification when communicating metered fluid to the head end of the cylinder.

In the subject embodiment, if the ratio of the head end area B to the rod end area A is X, and if the flow through the main fluid path is equal to C, and if the flow through the amplification fluid path 101 is D; then:

$$\frac{B}{A} = X = \frac{C+D}{C}.$$

In other words, the amplification ports 97 must be sized so that the total flow D through the amplification fluid path 101 satisfies the above equation, and the result is the same number of turns, lock-to-lock, for either turn condition.

In the commercially available flow amplification steering control units sold by the assignee of the present invention, it has been common practice to begin to open the A1 orifice first, and then to begin to open the flow amplification orifice. For example, the A1 orifice may begin to open at 3 degrees relative displacement between the spool and sleeve, whereas the flow amplification orifice may begin to open at 4 degrees of relative displacement.

However, in practicing the present invention, wherein the flow amplification ratios differ for left and right turn conditions to compensate for an unequal area cylinder, it is considered preferable to utilize a flow amplification design of the type which may be referred to as "instant on". In other words, the flow amplification orifice 99 begins to open at exactly the same time as the A1 orifice, and maintains a substantially constant amplification ratio as the spool and sleeve are thereafter further displaced.

Alterative Embodiment

Figure 9:
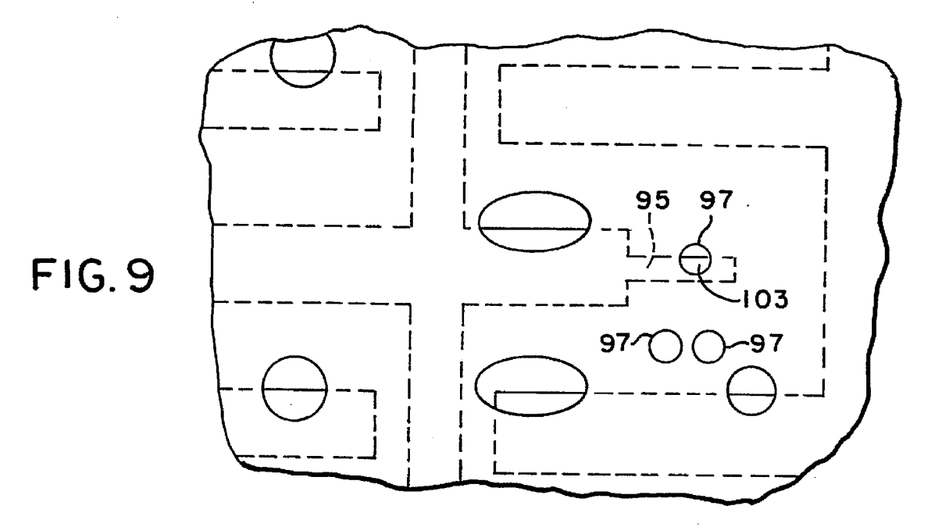
FIGS. 9 and 10 are further enlarged, fragmentary overlay views, similar to FIGS. 6 through 8, illustrating an alternative embodiment of the present invention, in the left turn and right turn conditions, respectively.
Figure 10:
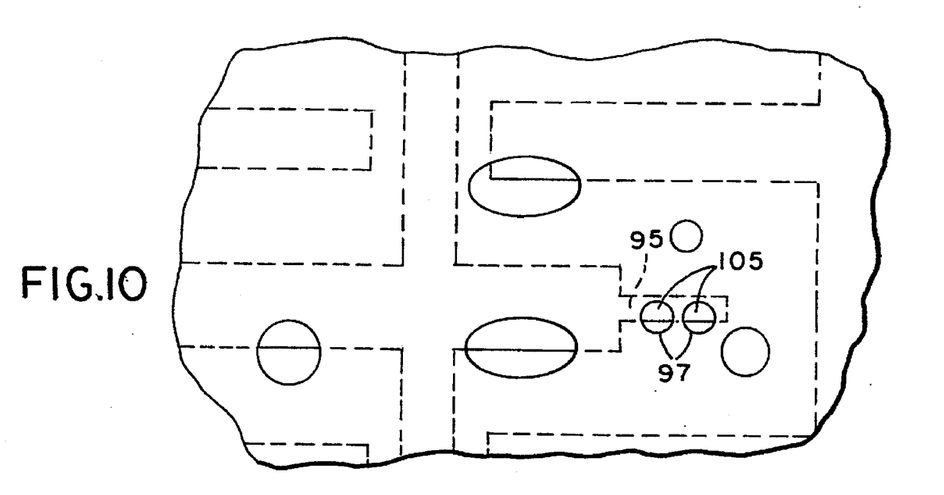

Referring now primarily to FIGS. 9 and 10, there is illustrated an alternative embodiment of the present invention in which both the left turn and right turn conditions utilize an amplification fluid path, including a variable amplification orifice, wherein the amplification ratios differ for the left turn and the right turn conditions. In the embodiment of FIGS. 9 and 10, there are three of the flow amplification ports, and by way of example only, all three are the same size. In the left turn condition shown in FIG. 9 one of the ports 97 communicates with the axial slot 95, the overlap therebetween defining a variable amplification orifice 103, and thus providing a particular flow amplification ratio, for example, 1.4:1. In the right turn condition shown in FIG. 10, there are two of the amplification ports 97 in fluid communication with the axial slot 95, the overlap therebetween defining a larger variable amplification orifice 105, such that the flow amplification ratio in a right turn would be 1.8:1.

In the alternative embodiment, if the ratio of the head end area B to the rod end area A is again X, and if the flow through the main fluid path is again equal to C, and if the flow through the amplification fluid path in a left turn is D, and if the flow through the amplification fluid path in a right turn is E (wherein the flow E=2 X the flow D); then:

$$\frac{B}{A} = X = \frac{C+E}{C+D}$$

In certain types of vehicles, it may be desirable to combine the two embodiments described above in a single fluid controller. For example, it may be desirable to begin, at a relatively small displacement of several degrees, the "one-way amplification" arrangement of FIGS. 7 and 8, and to continue that until a certain predetermined displacement has been achieved between the spool and sleeve. Above that predetermined displacement, the "two-way, unequal amplification" of FIGS. 9 and 10 would be utilized. However, it should be understood that, during each "type" of amplification, the ratio of the flow to the head end B to the flow to the rod end A must equal X, in order to accomplish the main objective of the present invention, i.e., equal turns lock-to-lock for either direction of steering.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A controller operable to control the flow of fluid from a source of pressurized fluid to an unequal area piston-cylinder fluid pressure device having a rod end area (A) and a head end area (B), in which the ratio of said head end area (B) to said rod end area (A) is X; said controller being of the type including housing means defining an inlet port for connection to the source of pressurized fluid, a return port for connection to a reservoir, and first and second control fluid ports for connection to said rod end area (A) and said head end area (B3), respectively, of said fluid pressure device; valve means disposed in said housing means and defining a neutral position and first and second operating positions, oppositely disposed about said neutral position, said housing means and said valve means cooperating to define a first main fluid path communicating between said inlet port and said first control fluid port when said valve means is in said first operating position, and to define a second main fluid path communicating between said inlet port and said second control fluid port when said valve means is in said second operating position; fluid actuated means for imparting follow-up movement to said valve means proportional to the volume of fluid flow through said fluid actuated means, said fluid actuated means being disposed in series flow relationship in said first main fluid path when said valve means is in said first operating position, and in series flow relationship in said second main fluid path when said valve means is in said second operating position; said first and second main fluid paths each including a variable flow control orifice, having a minimum flow area when said valve means is in said neutral position, and an increasing flow area as said valve means is displaced toward, respectively, said first and second operating positions; said housing means and said valve means cooperating to define first and second amplification fluid paths, in parallel with, respectively, said first and second main fluid paths, said first and second amplification fluid paths bypassing said fluid actuated means and including, respectively, first and second variable amplification orifices; said variable flow control orifices of said first and second main fluid paths having equal flow areas (C) when said valve means is in, respectively, said first and second operating positions; characterized by:

(a) said first variable amplification orifice having a flow area (D) when said valve means is in said first operating position;

(b) said second variable amplification orifice having a flow area (E) when said valve means is in said second operating position; whereby:

the ratio of said flow areas (C+E) to said flow areas (C+D) is equal to X.

2. A controller as claimed in claim 1 characterized by said variable flow control orifices of said first and second main fluid paths each begin to open at a displacement of Y, in first and second opposite directions, respectively, from said neutral position of said valve means.

3. A controller as claimed in claim 2 characterized by said first and second variable amplification orifices each begin to open at said displacement Y, in said first and second opposite directions, respectively, from said neutral position of said valve means.

4. A controller as claimed in claim 1 characterized by said valve means comprising a primary, rotatable valve member and a cooperating, relatively rotatable follow-up valve member, said primary and follow-up valve members defining said neutral position relative to each other.

5. A controller operable to control the flow of fluid from a source of pressurized fluid to an unequal area piston-cylinder fluid pressure device having a rod end area (A) and a head end area (B), in which the ratio of said head end area (B) to said rod end area (A) is X; said controller being of the type including housing means defining an inlet port for connection to the source of pressurized fluid, a return port for connection to a reservoir, and first and second control fluid ports for connection to said rod end area (A) and said head end area (B), respectively, of said fluid pressure device; valve means disposed in said housing means and defining a neutral position and first and second operating positions, oppositely disposed about said neutral position, said housing means and said valve means cooperating to define a first main fluid path communicating between said inlet port and said first control fluid port when said valve means is in said first operating position, and to define a second main fluid path communicating between said inlet port and said second control fluid port when said valve means is in said second operating position; fluid actuated means for imparting follow-up movement to said valve means proportional to the volume of fluid flow through said fluid actuated means, said fluid actuated means being disposed in series flow relationship in said first main fluid path when said valve means is in said first operating position, and in series flow relationship in said second main fluid path when said valve means is in said second operating position; said first and second main fluid paths each including a variable flow control orifice, having a minimum flow area when said valve means is in said neutral position, and an increasing flow area as said valve means is displaced toward, respectively, said first and second operating positions; said variable flow control orifices of said first and second main fluid paths having equal flow areas (C) when said valve means is in, respectively, said first and second operating positions, characterized by:

(a) said housing means and said valve means cooperating to define an amplification fluid path in parallel with only said second main fluid path, said amplification fluid path bypassing said fluid actuated means, and including a variable amplification orifice having a flow area (D) when said valve means is in said second operating position;

(b) whereby:

the ratio of said flow areas (C+D) to said flow area (C) is equal to the ratio of B to A.

* * * * *